(12) United States Patent
Koiwai et al.

(10) Patent No.: US 12,147,060 B2
(45) Date of Patent: Nov. 19, 2024

(54) IMAGE STABILIZING APPARATUS AND LENS BARREL HAVING THE SAME

(71) Applicant: CANON KABUSHIKI KAISHA, Tokyo (JP)

(72) Inventors: Kenta Koiwai, Tochigi (JP); Kazuhiro Noguchi, Tochigi (JP); Kunihiko Sasaki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 291 days.

(21) Appl. No.: 17/717,346

(22) Filed: Apr. 11, 2022

(65) Prior Publication Data
US 2022/0342229 A1   Oct. 27, 2022

(30) Foreign Application Priority Data
Apr. 21, 2021   (JP) ................ 2021-072200

(51) Int. Cl.
*G02B 27/64*   (2006.01)
(52) U.S. Cl.
CPC ................ *G02B 27/648* (2013.01)
(58) Field of Classification Search
None
See application file for complete search history.

(56) References Cited

U.S. PATENT DOCUMENTS

| | | | |
|---|---|---|---|
| 11,131,830 B2 | 9/2021 | Park | |
| 2019/0128698 A1* | 5/2019 | Umehara | ............ G01D 5/145 |

FOREIGN PATENT DOCUMENTS

| | | |
|---|---|---|
| JP | 2010276842 A | 12/2010 |
| JP | 2016170393 A | 9/2016 |
| JP | 2020144364 A | 9/2020 |

* cited by examiner

*Primary Examiner* — Robert E. Tallman
(74) *Attorney, Agent, or Firm* — ROSSI, KIMMS & McDOWELL LLP (57) ABSTRACT

An image stabilizing apparatus includes a driver configured to drive an optical system configured to correct an image blur in a direction that includes a component in a direction orthogonal to an optical axis, detectors configured to detect position information on the optical system, and a controller configured to control the driver. The detectors are disposed at a first detecting position and a second detecting position on a plane orthogonal to the optical axis. At the first detecting position, position information in a first detecting direction and position information in a second detecting direction different from the first detecting direction are detected. At the second detecting position, position information in a third detecting direction is detected. At least two of the first to third detecting directions are orthogonal to each other.

13 Claims, 6 Drawing Sheets

IMAGE STABILIZING APPARATUS AND LENS BARREL HAVING THE SAME

BACKGROUND OF THE INVENTION

Field of the Invention

The present invention relates to an image stabilizing apparatus.

Description of the Related Art

One conventional image stabilizing apparatus for correcting an image blur has a mechanism for preventing an image stabilizing lens from rolling on a plane orthogonal to an optical axis in order to improve the correction effect. In recent years, in order to reduce a size of a lens barrel, the image stabilizing apparatus has been required to significantly cut part so that a member that is disposed at a specific phase on the plane orthogonal to the optical axis in a lens barrel can overlap part of the image stabilizing apparatus in an optical axis direction.

Japanese Patent Laid-Open No. ("JP") 2010-276842 discloses an image stabilizing apparatus that corrects rolling amounts by controlling two drivers according to the rolling amounts about the optical axis that have been detected by three detectors. The image stabilizing apparatus disclosed in JP 2010-276842 can significantly cut part because a roll preventive mechanism can be eliminated without deteriorating the correction effect. In addition, the image stabilizing apparatus disclosed in JP 2010-276842 can be made smaller by disposing the detectors inside the coil.

However, in the image stabilizing apparatus disclosed in JP 2010-276842, the detectors are affected by the magnetic field of the coil and the detection accuracy deteriorates. When the detectors are disposed outside the coil so as not to be affected by the magnetic field of the coil, a space for three detectors becomes necessary in addition to a space for the drivers on the plane orthogonal to the optical axis and thus a cutout amount of the image stabilizing apparatus becomes smaller, and the lens barrel consequently becomes larger.

SUMMARY OF THE INVENTION

The present invention provides an image stabilizing apparatus that has good detection accuracy and can be made smaller.

An image stabilizing apparatus according to one aspect of the present invention includes a driver configured to drive an optical system configured to correct an image blur in a direction that includes a component in a direction orthogonal to an optical axis, detectors configured to detect position information on the optical system, and a controller configured to control the driver. The detectors are disposed at a first detecting position and a second detecting position on a plane orthogonal to the optical axis. At the first detecting position, position information in a first detecting direction and position information in a second detecting direction different from the first detecting direction are detected. At the second detecting position, position information in a third detecting direction is detected. At least two of the first to third detecting directions are orthogonal to each other.

A lens barrel according to another aspect of the present invention includes an optical system configured to correct an image blur, and the above image stabilizing apparatus.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Corresponding elements in respective figures will be designated by the same reference numerals, and a duplicate description thereof will be omitted.

Figure 1:
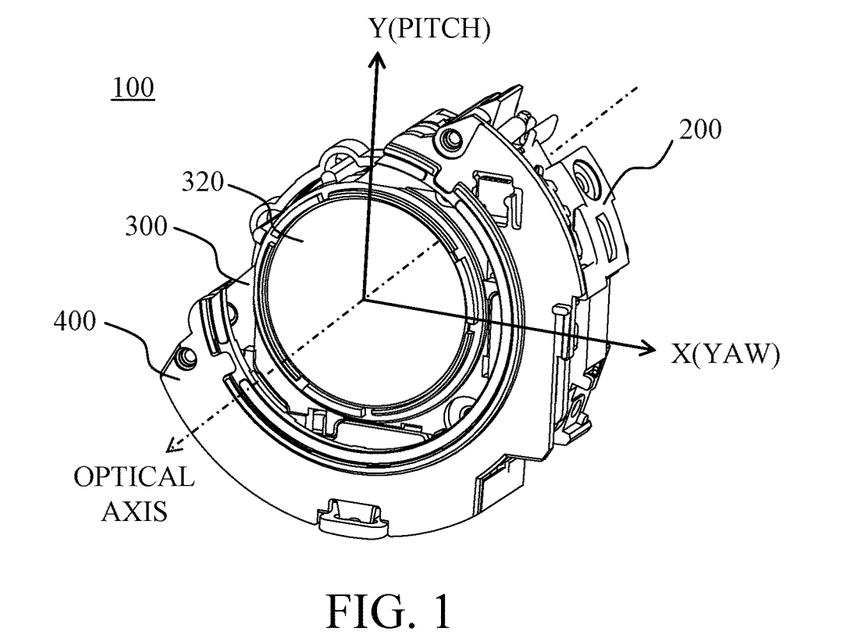
FIG. 1 is an external view of an image stabilizing apparatus according to one embodiment of the present invention.
Figure 2:
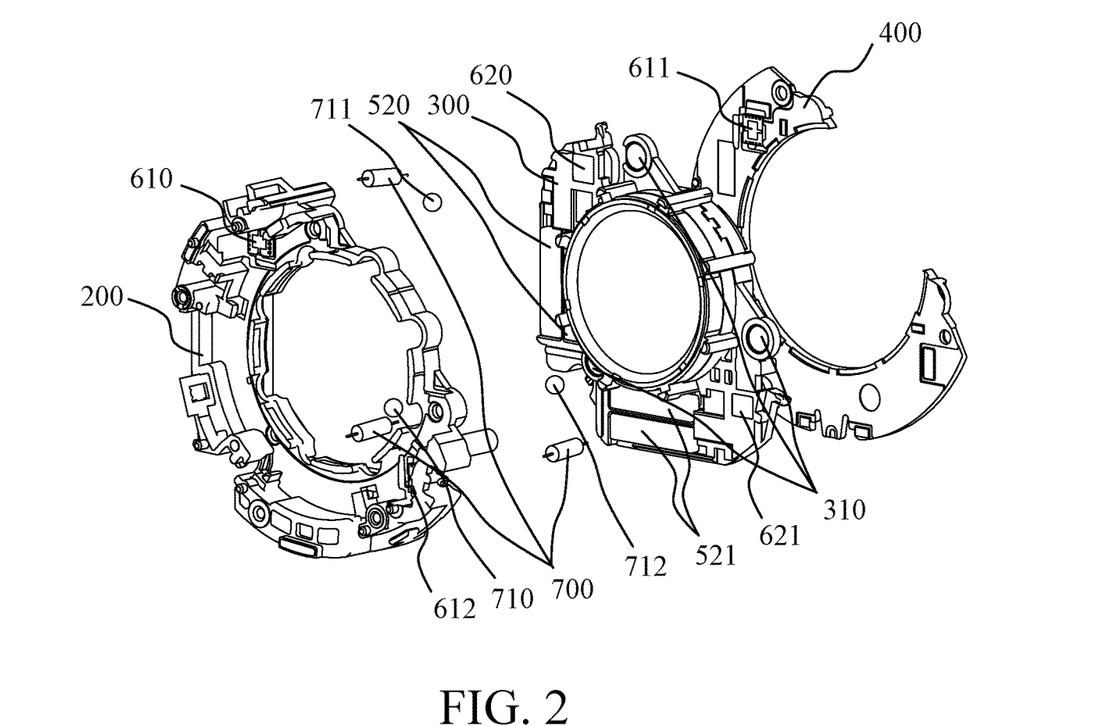
FIG. 2 is an exploded perspective view of the image stabilizing apparatus viewed from an object side.
Figure 3:
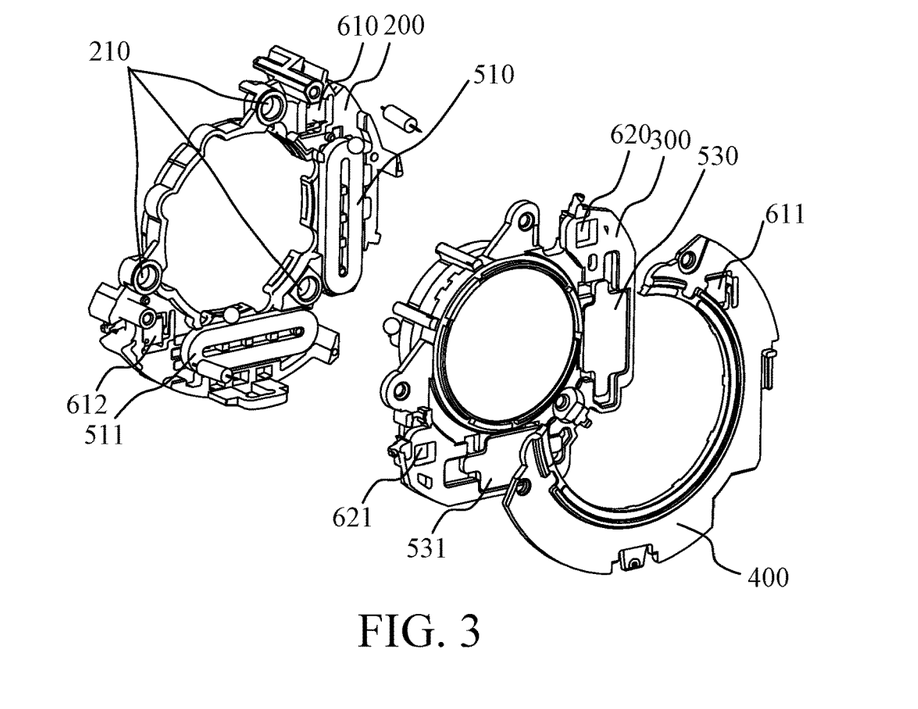
FIG. 3 is an exploded perspective view of the image stabilizing apparatus viewed from an image plane side.

FIG. 1 is an external view of an image stabilizing apparatus 100 according to one embodiment of the present invention. FIG. 2 is an exploded perspective view of the image stabilizing apparatus 100 viewed from an object side, and FIG. 3 is an exploded perspective view of the image stabilizing apparatus 100 viewed from the image plane side. An X-axis direction (yaw direction) and a Y-axis direction (pitch direction) in FIG. 1 are orthogonal to an optical axis and are orthogonal to each other. In this embodiment, being "orthogonal" covers not only being perfectly orthogonal but also a shift from the perfect orthogonality in a range of a permissible error (which can be considered to be orthogonal or which is substantially orthogonal).

The image stabilizing apparatus 100 is provided in a lens barrel and serves to correct an image blur. A lid member 400 is fixed to a shift base 200 by unillustrated screws. Driving coils 510 and 511 for driving a shift lens barrel 300 are fixed to the shift base 200. The driving coils 510 and 511 are connected to unillustrated a flexible printed circuit (FPC) board so that they can electrify the FPC board. The shift lens barrel 300 holds an image stabilizing lens (optical system) 320. The shift lens barrel 300 has driving magnets 520 and 521 for driving the shift lens barrel 300. The shift lens barrel 300 also has yokes 530 and 531. The driving magnets 520 and 521 are magnetically attracted to the yokes 530 and 531 so as to sandwich the shift lens barrel 300, respectively. The driving magnets 520 and 521 are arranged so as to face the driving coils 510 and 511, respectively. A voice coil motor (first driver) includes the driving coil 510, the driving magnet 520, and the yoke 530 and drives the shift lens barrel 300 in the yaw direction relative to the shift base 200. A voice coil motor (second driver) includes the driving coil 511, the driving magnet 521, and the yoke 531 and drives the shift lens barrel 300 in the pitch direction relative to the shift base 200.

In this embodiment, these two drivers drive the shift lens barrel 300 in the yaw and pitch directions, respectively, but the present invention is not limited to this embodiment as long as they can move the shift lens barrel 300 in a driving direction including a component in a direction orthogonal to the optical axis. For example, each of these two drivers may drive the shift lens barrel 300 in a driving direction that is different from the yaw direction and the pitch direction. In this case, these two drivers may drive the shift lens barrel 300 in two directions that form 45 degrees relative to the yaw direction and the pitch direction, respectively. Thereby, a detecting position for detecting position information on the shift lens barrel 300 on the plane orthogonal to the optical axis can be set to an X-axis or a Y-axis, and thus a processing load of a microcomputer 810, which will be described below, can be reduced.

The driving coils may be provided to the shift lens barrel 300, and the driving magnets and the yokes may be provided to at least one of the shift base 200 and the lid member 400.

Three balls 710, 711, and 712 are disposed between the shift base 200 and the shift lens barrel 300. The balls 710, 711, and 712 contact a base-side ball contact portion 210 of the shift base 200 and a barrel-side ball contact portion 310 of the shift lens barrel 300, respectively. The balls 710, 711, and 712 are made of materials such as ceramic and SUS304 so as not to be attracted by the neighboring driving magnets. The shift lens barrel 300 is urged toward the shift base 200 by tension springs 700, and movable in a direction including a component in the direction orthogonal to the optical axis. In this embodiment, the shift lens barrel 300 is urged toward the shift base 200 by the tension springs 700, but may be urged toward the shift base 200, for example, by a magnetic force.

Figure 4:
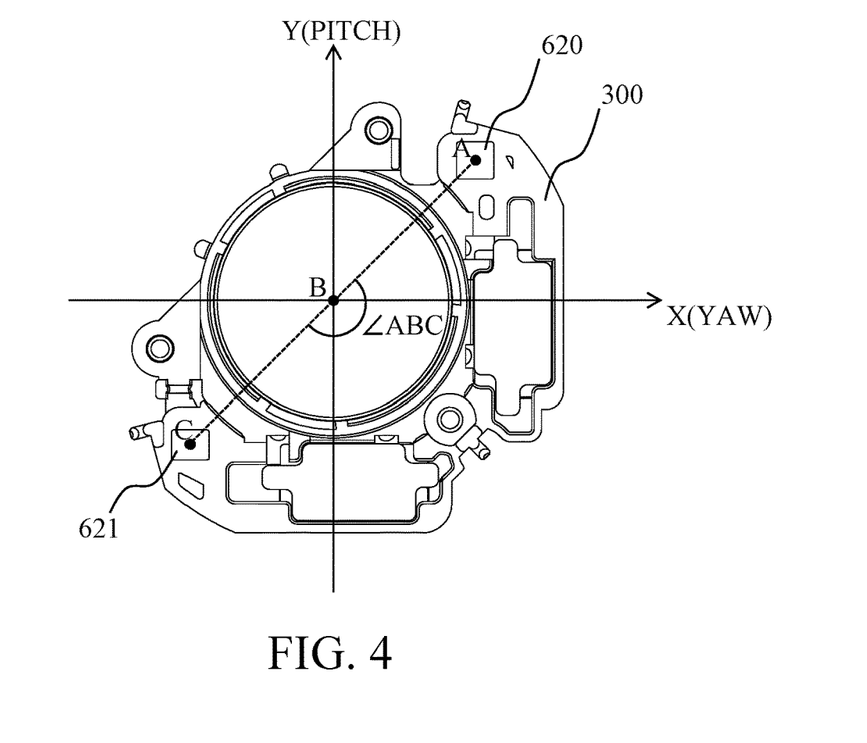
FIG. 4 explains a detecting position.
Figure 5:
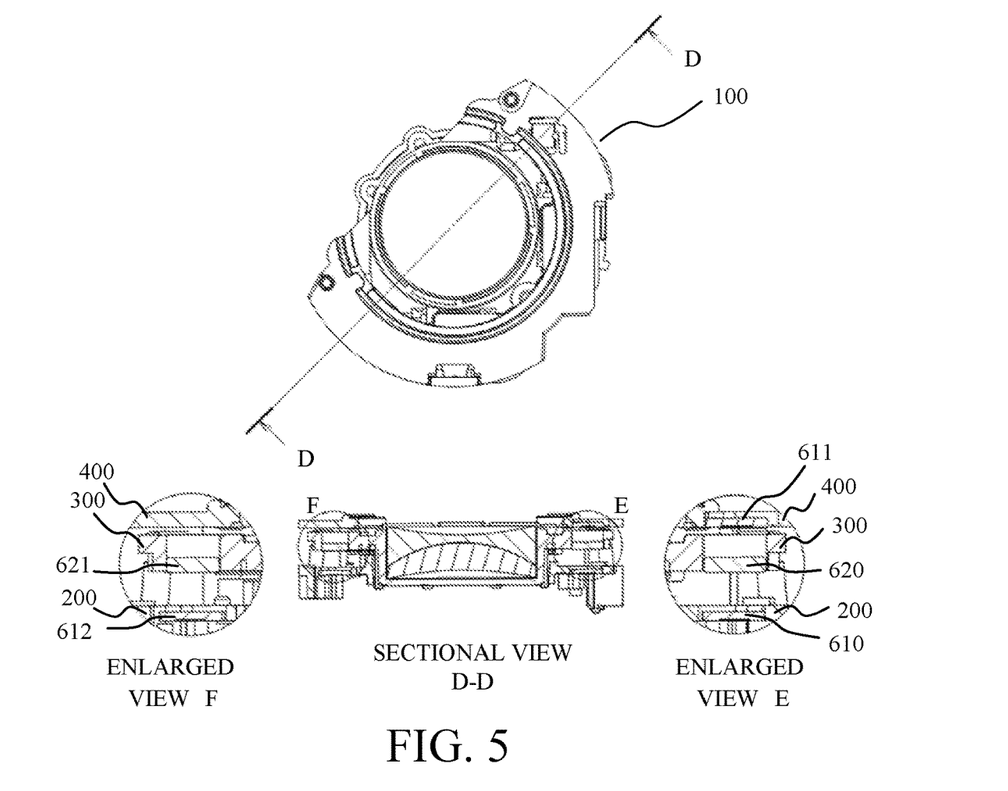
FIG. 5 is a sectional view at each detecting position.

Referring now to FIGS. 2 to 5, a description will be given of detectors that detect position information on the shift lens barrel 300 relative to the shift base 200. FIG. 4 explains a detecting position of the detector. FIG. 5 is a sectional view taken at the first detecting position and the second detecting position on the plane orthogonal to the optical axis.

In this embodiment, a first detector that includes Hall ICs (magnetic detectors) 610 and 612 and a magnet 620 is disposed at the first detecting position illustrated by a point A in FIG. 4. A second detector that includes a Hall IC 611 and a magnet 621 is disposed at the second detecting position illustrated by a point C in FIG. 4.

The Hall ICs 610 and 612 are fixed to the shift base 200. The Hall IC 611 is fixed to the lid member 400. Each of the Hall ICs 610, 611, and 612 is connected to an unillustrated FPC board, and detects the position information on the shift lens barrel 300 from a magnetic change due to the position change of the shift lens barrel 300. The Hall ICs 610 and 611 are configured so that their detecting directions are different. More specifically, the Hall IC 610 detects the position information in the pitch direction of the shift lens barrel 300, and the Hall IC 611 detects the position information in the pitch direction of the shift lens barrel 300 different from the detecting direction detected by the Hall IC 610. The Hall IC 612 detects the position information in the yaw direction of the shift lens barrel 300. This embodiment uses the Hall ICs, and can achieve higher detection accuracy in a low-temperature or high-temperature environment and detect a longer stroke than those of a Hall element. The magnets 620 and 621 are fixed to the shift lens barrel 300. The magnet 620 is disposed so as to face the Hall ICs 610 and 611. The magnet 621 is disposed so as to face the Hall IC 612. As illustrated in an enlarged view E in FIG. 5, the Hall ICs 610 and 611 are arranged so as to sandwich the magnet 620 in the optical axis direction. By arranging the Hall ICs 610 and 611 in this way, the number of components can be smaller than a case where a single magnet is used for a single sensor. Since one sensor can be reduced, part of the image stabilizing apparatus 100 can be significantly cut out (the image stabilizing apparatus 100 can be made smaller).

In this embodiment, the Hall IC 610 detects the position information in the pitch direction of the shift lens barrel 300, and the Hall ICs 611 and 612 detect the position information in the yaw direction of the shift lens barrel 300, but the present invention is limited to this embodiment, as long as at least two of the three detecting directions are orthogonal to each other. For example, the Hall ICs 610 and 612 may detect the position information in the yaw direction of the shift lens barrel 300, and the Hall IC 611 may detect the position information in the pitch direction of the shift lens barrel.

This embodiment uses the Hall ICs to detect the position information on the shift lens barrel 300, but the position information may be detected, for example, by using a sensor that optically detects the position information.

Although three sensors capable of each detecting one direction are used in this embodiment, for example, a single sensor capable of detecting two directions and a single sensor capable of detecting at least one direction may be used.

In this embodiment, the detecting directions of the position information on the shift lens barrel 300 are the yaw direction and the pitch direction, but they do not have to be the yaw direction and the pitch direction as long as they are orthogonal to each other. A detecting direction other than the two orthogonal directions may be a direction different from the two orthogonal directions.

Figure 6:
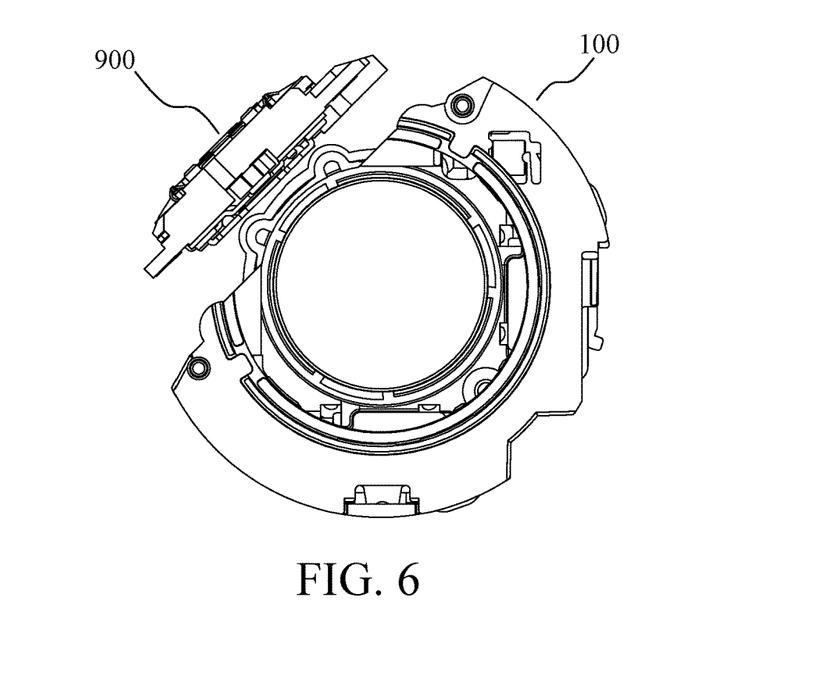
FIG. 6 is an arrangement diagram of a member different from the image stabilizing apparatus in a lens barrel.

The first detecting position and the second detecting position may be set so that ∠ABC (which is an angle on a driver side of angles formed by a straight line connecting the first detecting position and the optical axis on the plane orthogonal to the optical axis and a straight line connecting the second detecting position and the optical axis) is 240 degrees or smaller. In the lens barrel, a movable unit that is movable along the optical axis during focusing, zooming, an aberration variation, etc., and a holding barrel that holds the image stabilizing apparatus 100 often move along the optical axis through a cam mechanism that includes a cam follower and a cam groove. In that case, the cam followers may be disposed at three locations equally divided into 120 degrees. In an area of 120 degrees or more (area opposite to the drivers) between the two cam followers, as illustrated in FIG. 6, a member may be disposed at a specific phase such as a driver 900 that drives the movable unit. On the other hand, by setting the first detecting position and the second detecting position in the area of 240 degrees or less, the driver 900 can be disposed so as to overlap part of the image stabilizing apparatus 100 in the optical axis direction.

Figure 7:
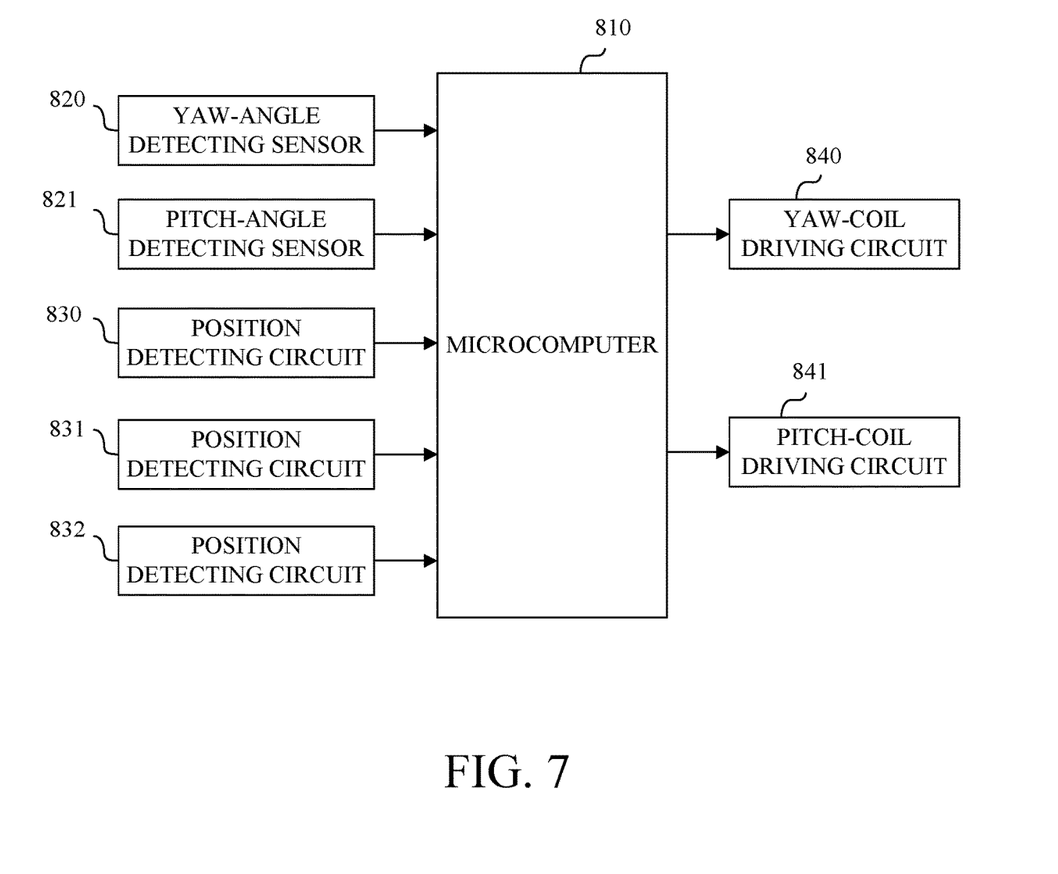
FIG. 7 illustrates a controller of a lens barrel that includes the image stabilizing apparatus.

FIG. 7 illustrates a controller (control unit) of a lens barrel having the image stabilizing apparatus 100. A yaw-angle detecting sensor 820 and a pitch-angle detecting sensor 821 are sensors such as vibration gyros. Detecting circuits 830, 831, and 832 include Hall IC 610, 611, and 612, respectively. A microcomputer (controller) 810 acquires a signal made by amplifying and properly performing a phase compensation for a difference signal between shake signals from the yaw-angle detecting sensor 820 and the pitch-angle detecting sensor 821 and signals from the detecting circuits 830, 831, and 832. The microcomputer 810 electrifies the driving coils 510 and 511 via a yaw-coil driving circuit 840 and a pitch-coil driving circuit 841 using the acquired signal, and drives the shift lens barrel 300. Thereby, the image stabilizing lens 320 is positioned, controlled, and held at the target position so that the above difference signal becomes smaller.

Figure 8A:
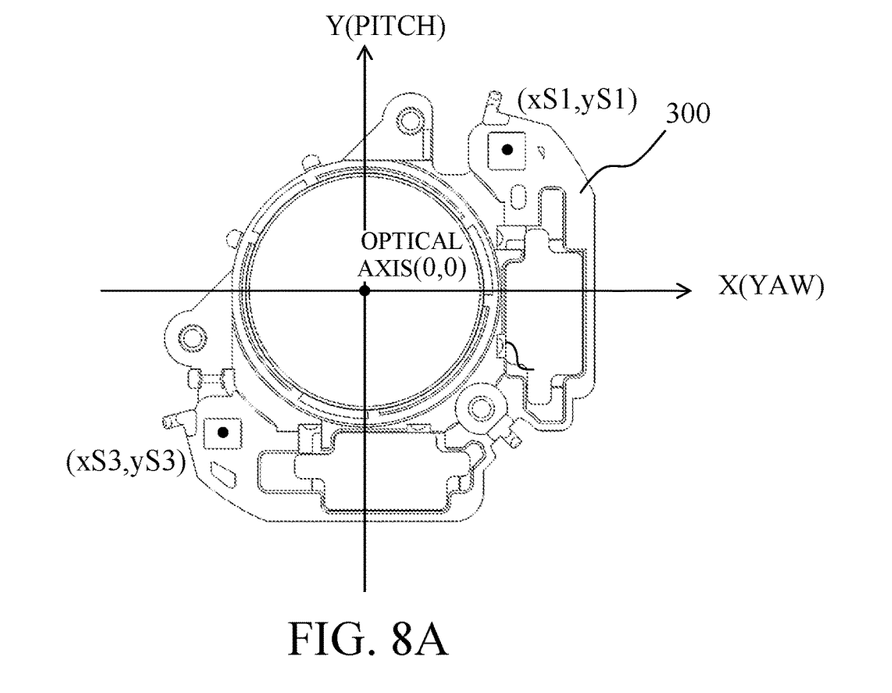
FIGS. 8A and 8B explain a method of acquiring a moving amount of a shift lens barrel.
Figure 8B:
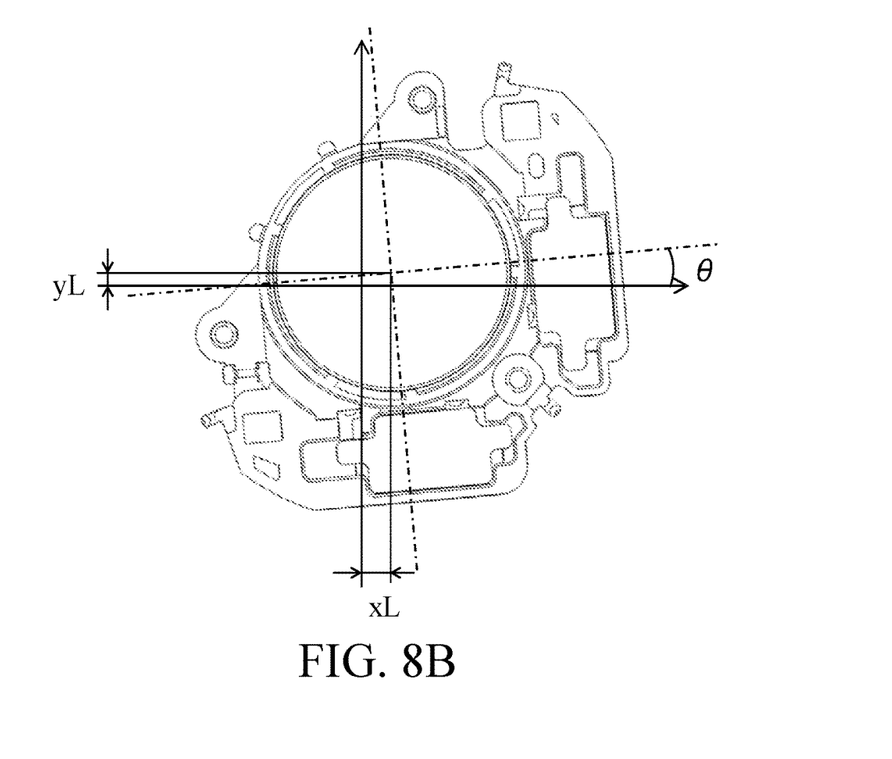

Referring now to FIGS. 8A and 8B, a description will be given of a method of acquiring a moving amount of the shift lens barrel 300. FIGS. 8A and 8B explain the method of acquiring the moving amount of the shift lens barrel 300. FIGS. 8A and 8B illustrate states of the shift lens barrel 300 before and after the movement, respectively.

Assume that (0, 0) is a coordinate of the optical axis, and (x, y) is a coordinate of a point that is separated from the optical axis by x in the yaw direction and y in the pitch direction. (xS1, yS1) is a coordinate of each of positions of the Hall ICs 610 and 611 (first detecting position), and (xS3, yS3) is a coordinate of a position of the Hall IC 612 (second detecting position). xL is a moving amount in the yaw direction of the shift lens barrel 300, yL is a moving amount in the pitch direction of the shift lens barrel 300, θ is a rolling amount (rotating amount on the plane orthogonal to the optical axis), and S1, S2, and S3 are detected values of the Hall ICs 610, 611, and 612, respectively.

At this time, each of the detected values S1, S2, and S3 of the Hall ICs 610, 611, and 612 is expressed by the sum of the moving amount as a result of rolling and the translational moving amount of the shift lens barrel 300, as in the following expressions (1) to (3).

$$S1 = xS1 \cdot \sin\theta + yS1 \cdot \cos\theta - yS1 + yL \quad (1)$$

$$S2 = xS1 \cdot \cos\theta - yS1 \cdot \sin\theta - xS1 + xL \quad (2)$$

$$S3 = xS3 \cdot \cos\theta - yS3 \cdot \sin\theta - xS3 + xL \quad (3)$$

The microcomputer 810 acquires the moving amount (xL, yL) of the shift lens barrel 300 expressed by the following expressions (4) and (5) using the expressions (1) and (2).

$$xL = S2 + xS1 \cdot (1 - \cos\theta) + yS1 \cdot \sin\theta \quad (4)$$

$$yL = S1 - xS1 \cdot \sin\theta + yS1 \cdot (1 - \cos\theta) \quad (5)$$

From the expressions (2) and (3), the rolling amount θ is expressed by the following expression (6a) or (6b) according to the coordinates of the two detecting positions.

$$\theta = \arcsin((S2-S3+xS1-xS3)/\sqrt{((yS3-yS1)^2+(xS1-xS3)^2)}) - \arcsin((xS1-xS3)/\sqrt{((yS3-yS1)^2+(xS1-xS3)^2)}) \quad (6a)$$

$$\theta = -\arcsin((S2-S3+xS1-xS3)/\sqrt{((yS3-yS1)^2+(xS1-xS3)^2)}) + \arcsin((xS1-xS3)/\sqrt{((yS3-yS1)^2+(xS1-xS3)^2)}) \quad (6b)$$

In order to reduce the processing load of the microcomputer 810, the moving amount of the shift lens barrel 300 may be acquired, for example, by using the following approximate expressions (7) and (8), or a relationship between the detected values S1, S2, and S3 and the moving amount of the shift lens barrel 300 may be previously acquired and the value may be used.

$$xL = S2 + (S3-S2) \cdot yS1/(yS1-yS3) \quad (7)$$

$$yL = S1 - (S3-S2) xS1/(yS1-yS3) \quad (8)$$

In this embodiment, the detecting directions of the Hall ICs 610, 611, and 612 are the pitch direction, the yaw direction, and the yaw direction, but the present invention is not limited to this embodiment. For example, in a case where the detecting directions of the Hall ICs 610, 611, and 612 are the pitch direction, the yaw direction, and the pitch direction, the moving amount of the shift lens barrel 300 can be changed by replacing the expression (3) with the following expression (9).

$$S3 = xS3 \cdot \sin\theta + yS3 \cdot \cos\theta - yS3 + yL \quad (9)$$

Figure 9:
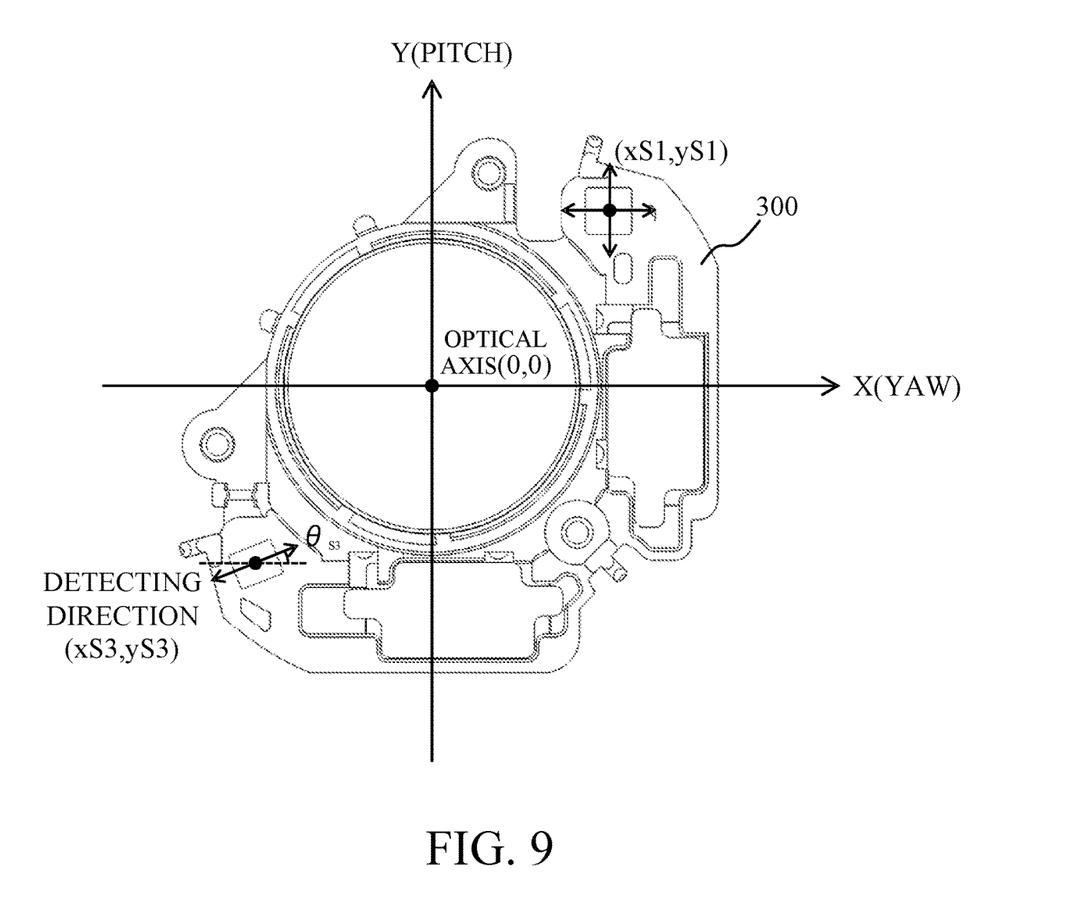
FIG. 9 explains a method of acquiring a moving amount of the shift lens barrel in a case where a detecting direction is different from that of FIGS. 8A and 8B.

As illustrated in FIG. 9, for example, in a case where the detecting directions of the Hall ICs 610, 611, and 612 are directions forming an angle $\theta_{S3}$ relative to the pitch direction, the yaw direction, and the yaw direction, the detected values S1, S2, and S3 are expressed by the following expressions (10) to (12), respectively.

$$S1 = xS1 \cdot \sin\theta + yS1 \cdot \cos\theta - yS1 + yL \quad (10)$$

$$S2 = xS1 \cdot \cos\theta - yS1 \cdot \sin\theta - xS1 + xL \quad (11)$$

$$S3 = xS3 \cdot \cos\theta_{S3} \cdot \cos\theta - yS3 \cdot \cos\theta_{S3} \cdot \sin\theta - xS3 \cdot \cos\theta_{S3} + xL \cdot \cos\theta_{S3} + xS3 \cdot \sin\theta_{S3} \cdot \sin\theta + yS3 \cdot \sin\theta_{S3} \cdot \cos\theta - yS3 \cdot \sin\theta_{S3} + yL \cdot \sin\theta_{S3} \quad (12)$$

The microcomputer 810 acquires the moving amount (xL, yL) of the shift lens barrel 300 expressed by the following expressions (13) and (14).

$$xL = S2 + xS1 \cdot (1 - \cos\theta) + yS1 \cdot \sin\theta \quad (13)$$

$$yL = S1 - xS1 \cdot \sin\theta + yS1 \cdot (1 - \cos\theta) \quad (14)$$

The rolling amount θ is expressed by the following expression (15a) or (15b) according to coordinates of two detecting positions.

$$\theta = \arcsin((S3-S2\cos\theta_{S3}-S1\sin\theta_{S3}+(yS3-yS1)\cdot\sin\theta_{S3}+(xS3-xS1)\cdot\cos\theta_{S3})/\sqrt{((xS3-xS1)\cdot\sin\theta_{S3}+(yS1-yS3)\cdot\cos\theta_{S3})^2+((yS3-yS1)\cdot\sin\theta_{S3}+(xS3-xS1)\cdot\cos\theta_{S3})^2})-\arcsin(((yS3-yS1)\cdot\sin\theta_{S3}+(xS3-xS1)\cdot\cos\theta_{S3})/\sqrt{((xS3-xS1)\cdot\sin\theta_{S3}+(yS1-yS3)\cdot\cos\theta_{S3})^2+((yS3-yS1)\cdot\sin\theta_{S3}+(xS3-xS1)\cdot\cos\theta_{S3})^2}) \quad (15a)$$

$$\theta = -\arcsin((S3-S2\cdot\cos\theta_{S3}-S1\cdot\sin\theta_{S3}+(yS3-yS1)\cdot\sin\theta_{S3}+(xS3-xS1)\cdot\cos\theta_{S3})/\sqrt{((xS3-xS1)\cdot\sin\theta_{S3}+(yS1-yS3)\cdot\cos\theta_{S3})^2+((yS3-yS1)\cdot\sin\theta_{S3}+(xS3-xS1)\cdot\cos\theta_{S3})^2})+\arcsin(((yS3-yS1)\cdot\sin\theta_{S3}+(xS3-xS1)\cdot\cos\theta_{S3})/\sqrt{((xS3-xS1)\cdot\sin\theta_{S3}+(yS1-yS3)\cdot\cos\theta_{S3})^2+((yS3-yS1)\cdot\sin\theta_{S3}+(xS3-xS1)\cdot\cos\theta_{S3})^2}) \quad (15b)$$

In order to reduce the processing load of the microcomputer 810, the moving amount of the shift lens barrel 300 may be acquired, for example, by using the following approximate expressions (16) and (17), or a relationship between the detected values S1, S2, and S3 and the moving amount of the shift lens barrel 300 may be previously acquired and the value may be used.

$$xL = S2 + (S3-S2\cdot\cos\theta_{S3}-S1\cdot\sin\theta_{S3})\cdot yS1/((xS3-xS1)\cdot\sin\theta_{S3}+(yS1-yS3)\cdot\cos\theta_{S3}) \quad (16)$$

$$yL = S1 - (S3-S2\cdot\cos\theta_{S3}-S1\cdot\sin\theta_{S3})\cdot xS1/((xS3-xS1)\cdot\sin\theta_{S3}+(yS1-yS3)\cdot\cos\theta_{S3}) \quad (17)$$

The microcomputer 810 acquires the target position of the image stabilizing lens 320 according to the moving amount xL in the yaw direction, the moving amount yL in the pitch direction, the shake signal from the yaw-angle detecting sensor 820, and the shake signal from the pitch-angle detecting sensor 821. The microcomputer 810 acquires power necessary to move the image stabilizing lens 320 to the target position, and electrifies the driving coils 510 and 511 in order to generate the required power via the yaw-coil driving circuit 840 and the pitch-coil driving circuit 841. Thereby, even if the shift lens barrel 300 rolls, the image blur can be corrected with high accuracy. Therefore, the influence of the rolling of the shift lens barrel 300 on the optical performance can be suppressed, and thus it is unnecessary to mount a roll preventive mechanism on the lens barrel.

A control such as suppressing of rolling may be conducted by using the expression for acquiring the rolling amount, or a roll preventive mechanism may be provided to the lens barrel.

The above configuration can provide the image stabilizing apparatus 100 that has good detection accuracy and can be made smaller. As described above, the driver 900 can be disposed in a space acquired by making smaller the image stabilizing apparatus 100 so that the driver 900 overlaps part of the image stabilizing apparatus 100 in the optical axis direction, and thus the lens barrel can be made smaller.

This embodiment disposes the driver (first actuator) 900 in the space acquired by making smaller the image stabilizing apparatus 100, but the present invention is not limited to this embodiment. For example, a member to be disposed at a specific phase may be disposed there, such as a movable unit, a guide bar (guide member) for linearly guiding the movable unit along an optical axis, and an actuator (second actuator) for driving an aperture stop (diaphragm).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-072200, filed on Apr. 21, 2021, which is hereby incorporated by reference herein in its entirety.

What is claimed is:

1. An image stabilizing apparatus comprising:
a driver configured to drive an optical system configured to correct an image blur in a direction that includes a component in a direction orthogonal to an optical axis;
detectors configured to detect position information on the optical system; and
a controller configured to control the driver,
wherein the detectors are disposed at a first detecting position and a second detecting position on a plane orthogonal to the optical axis,
wherein at the first detecting position, position information in a first detecting direction and position information in a second detecting direction different from the first detecting direction are detected,
wherein at the second detecting position, position information in a third detecting direction is detected, and
wherein at least two of the first to third detecting directions are orthogonal to each other.

2. The image stabilizing apparatus according to claim 1, wherein the controller controls the driver using a moving amount on the plane orthogonal to the optical axis of the optical system acquired by using signals from the detectors and a rotating amount on the plane orthogonal to the optical axis of the optical system based on the signals from the detector.

3. The image stabilizing apparatus according to claim 1, wherein the first detecting direction is orthogonal to the second detecting direction.

4. The image stabilizing apparatus according to claim 1, wherein the third detecting direction is the same direction as the first detecting direction or the second detecting direction.

5. The image stabilizing apparatus according to claim 1, wherein each detector includes a magnetic detector and a magnet.

6. The image stabilizing apparatus according to claim 1, wherein;
the detectors include a first detector disposed at the first detecting position, and
the first detector includes one magnet and two magnetic detectors configured to detect a magnetism of the one magnet.

7. The image stabilizing apparatus according to claim 6, wherein the two magnetic detectors are disposed sandwiching the one magnet in an optical axis direction.

8. The image stabilizing apparatus according to claim 1, wherein an angle on a side of the driver of angles formed by a straight line connecting the first detecting position and the optical axis to the optical axis and a straight line connecting the second detecting position and the optical axis on the plane orthogonal is 240 degrees or smaller.

9. The image stabilizing apparatus according to claim 1, wherein the driver include a first driver configured to drive the optical system in a first driving direction, and a second driver configured to drive the optical system in a second driving direction orthogonal to the first driving direction.

10. The image stabilizing apparatus according to claim 9, wherein the first driving direction is the same as one of the two directions orthogonal to each other of the first to third detecting directions.

11. The image stabilizing apparatus according to claim 9, wherein the first driving direction is a direction forming 45 degrees relative to each of the two directions orthogonal to each other of the first to third detecting directions.

12. A lens barrel comprising:
an optical system configured to correct an image blur; and
an image stabilizing apparatus including:
a driver configured to drive an optical system configured to correct an image blur in a direction that includes a component in a direction orthogonal to an optical axis;
detectors configured to detect position information on the optical system; and
a controller configured to control the driver,
wherein the detectors are disposed at a first detecting position and a second detecting position on a plane orthogonal to the optical axis,
wherein at the first detecting position, position information in a first detecting direction and position information in a second detecting direction different from the first detecting direction are detected,
wherein at the second detecting position, position information in a third detecting direction is detected, and
wherein at least two of the first to third detecting directions are orthogonal to each other.

13. The lens barrel according to claim 12, further comprising:
a movable unit movable along the optical axis;
a first actuator configured to drive the movable unit;
a guide member configured to linearly guide the movable unit; and
a second actuator configured to drive a diaphragm,
wherein at least one of the movable unit, the first actuator, the guide member, or the second actuator is disposed in an area opposite to the driver of an area formed by a straight line connecting the first detecting position and the optical axis and a straight line connecting the second detecting position and the optical axis on the plane orthogonal to the optical axis so that the at least one overlaps part of the image stabilizing apparatus in an optical axis direction.

* * * * *